United States Patent
Fujisawa

(10) Patent No.: US 9,874,832 B2
(45) Date of Patent: Jan. 23, 2018

(54) ROLLER AND IMAGE FORMING APPARATUS USING SAME

(71) Applicant: BRIDGESTONE CORPORATION, Tokyo (JP)

(72) Inventor: Yusuke Fujisawa, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 15/507,953

(22) PCT Filed: Aug. 28, 2015

(86) PCT No.: PCT/JP2015/074367
§ 371 (c)(1),
(2) Date: Mar. 1, 2017

(87) PCT Pub. No.: WO2016/035691
PCT Pub. Date: Mar. 10, 2016

(65) Prior Publication Data
US 2017/0308000 A1 Oct. 26, 2017

(30) Foreign Application Priority Data

Sep. 4, 2014 (JP) ................................. 2014-179987

(51) Int. Cl.
*G03G 15/08* (2006.01)
*B05C 1/08* (2006.01)

(52) U.S. Cl.
CPC ................................. *G03G 15/0808* (2013.01)

(58) Field of Classification Search
USPC .... 399/252, 265, 279, 281, 286; 492/18, 48, 492/52
See application file for complete search history.

(56) References Cited

U.S. PATENT DOCUMENTS 6,283,903 B1 9/2001 Onuki et al.
7,203,451 B2* 4/2007 Kayahara ........... G03G 15/0808
399/286
(Continued)

FOREIGN PATENT DOCUMENTS

JP 63-198062 U1 12/1988
JP 07-329214 A 12/1995
(Continued)

OTHER PUBLICATIONS

International Search Report of PCT/JP2015/074367 dated Oct. 13, 2015.
(Continued)

*Primary Examiner* — Hoan Tran
(74) *Attorney, Agent, or Firm* — Sughrue Mion, PLLC

(57) ABSTRACT

Provided is a roller capable of suppressing generation of cut waste from an end of a roller due to contact with another member inside a device when mounted on an image forming device, particularly a conductive roller, and an image forming device using the same. A roller includes a shaft 1 and a base layer 2 provided on the outer periphery of the shaft. A filler layer 4 covering the base layer is provided on end faces of both ends of the base layer in the roller axial direction, and the filler layer is composed of a material having a breaking strain measured according to a tensile test of JIS K 7127 of not less than 120% and a tensile stress at 100% elongation measured according to a tensile test of JIS K 7127 of from 5 to 30 N/mm².

7 Claims, 2 Drawing Sheets

(56) References Cited

U.S. PATENT DOCUMENTS

| | | | |
|---|---|---|---|
| 8,971,754 B2 * | 3/2015 | Abe .................. | G03G 15/0818 399/105 |
| 2001/0003757 A1 | 6/2001 | Sakata et al. | |
| 2016/0018751 A1 | 1/2016 | Imai et al. | |

FOREIGN PATENT DOCUMENTS

| | | |
|---|---|---|
| JP | 09-262912 A | 10/1997 |
| JP | 10-254233 A | 9/1998 |
| JP | 2000-179539 A | 6/2000 |
| JP | 2007-147857 A | 6/2007 |
| JP | 2007-148100 A | 6/2007 |
| WO | 2014/136829 A1 | 9/2014 |

OTHER PUBLICATIONS

Communication dated Aug. 11, 2017, from the European Patent Office in counterpart European Application No. 15838890.0.

* cited by examiner

ROLLER AND IMAGE FORMING APPARATUS USING SAME

TECHNICAL FIELD

The present invention relates to a roller and an image formation device using the same (hereinafter, also simply referred to as a "device"), and in particular, to a conductive roller used in image formation devices such as copying machines, printers and in particular laser beam printers, and in particular to a roller suitable as a developing roller and an image formation device using the same.

BACKGROUND ART

In general, in image formation devices using electrophotographic printing methods such as copying machines, printers, facsimiles, etc., rollers provided with electrical conductivity are used such as transfer rollers, developing rollers, toner supply rollers, electrification rollers, cleaning rollers, intermediate transfer rollers, belt driving rollers, etc. in each step of the image formation.

As such a roller member, in order to obtain desired surface roughness, electrical conductivity and hardness etc., conventionally used is one that are provided with a layer or layers provided on the outer periphery of a basic structure which is a structure constituted by shaft on which an elastic layer is formed, the elastic layer being composed of rubber, polymeric elastomer, polymer foam. etc. which was given electrical conductivity by the combination of a conductive agent.

As a technology relating to the improvement of the conductive roller, for example, Patent document 1 describes a conductive roller having a core metal, a substrate provided on the surface thereof and a filler layer provided on the cylindrical surface of the substrate which is composed of conductive flexible polyurethane foam, wherein a release opening for a bubble of conductive flexible polyurethane foam in the cylindrical surface is blocked by the filler layer.

RELATED ART DOCUMENT

Patent Document

Patent Document 1: Japanese Unexamined Patent Publication No. H9-262912 (Claims etc.)

SUMMARY OF THE INVENTION

Problems to be Solved by the Invention

Incidentally, when a developing roller is mounted on a cartridge, in order to keep a contact width (nip width) between the roller and a photo sensitizer constant, a ring-shaped member may be disposed coaxially with the roller at an axial end of the roller. In such cases, as a device is used, the ring-shaped member and the end of the roller come into contact and rub against each other, the end of the roller is scraped, and cut waste may be generated. When such cut waste is transferred to a photo sensitizer, paper, or the like in an image forming device, generation of an image failure is caused, which has been problematic.

Accordingly, an object of the present invention is to provide a roller capable of suppressing generation of cut waste from an end of a roller due to contact with another member inside a device when mounted on an image forming device, particularly a conductive roller, and an image forming device using the same.

Means for Solving the Problems

The present inventor has intensively studied to find that the above-described problem can be solved by providing a filler layer made of a specific material on an axial end face of a roller, thereby completing the present invention.

In other words, the roller according to the present invention is a roller comprising a shaft and a base layer provided on an outer periphery of the shaft, characterized in that a filler layer covering the base layer is provided on end faces of both ends of the base layer in the roller axial direction, and the filler layer is composed of a material having a breaking strain measured according to a tensile test of JIS K 7127 of not less than 120% and a tensile stress at 100% elongation measured according to a tensile test of JIS K 7127 of from 5 to 30 N/mm$^2$.

In the roller of the present invention, preferably, the material of the filler layer contains a water-based urethane resin. In the roller of the present invention, preferably, the material of the filler layer contains a silicone-based additive, particularly in an amount of from 5 to 30% by mass. Further, in the roller of the present invention, suitably, a film thickness of the filler layer is from 10 to 100 µm. Still further, the roller of the present invention is suitably a conductive roller.

Further, the image forming device of the present invention is characterized in that the above-described roller of the present invention is mounted thereon.

Effects of the Invention

According to the present invention, by providing a filler layer composed of a material having predetermined physical properties on end faces of both ends of a base layer in the roller axial direction, it becomes possible to realize a roller capable of suppressing generation of cut waste from an end of a roller due to contact with another member inside a device when mounted on an image forming device, particularly a conductive roller, and an image forming device using the same.

MODE FOR CARRYING OUT THE INVENTION

Hereinafter, embodiments of the present invention will be described in detail with reference to the drawings.

Figure 1:
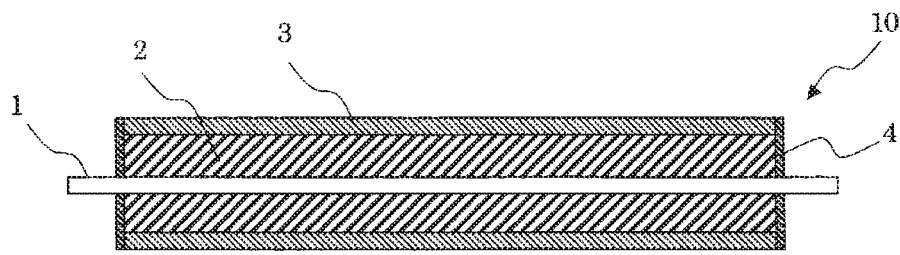
FIG. 1 is a longitudinal cross-sectional view illustrating one configuration example of a roller of the present invention.

FIG. 1 illustrates a longitudinal cross-sectional view of one example of a roller of the present invention. An illustrated roller 10 comprises a shaft 1, a base layer 2 supported on the outer periphery of the shaft 1, and one layer of a film layer 3 covering the outer periphery of the base layer 2.

The roller of the present invention has at least the base layer 2 on the outer periphery of the shaft 1, and a filler layer 4 covering the base layer 2 is provided on end faces of both ends of the base layer 2 in the roller axial direction. In the present invention, the filler layer 4 is characterized by being made of a material having a breaking strain of not less than 120% and a tensile stress at 100% elongation of from 5 to 30 N/mm$^2$.

In the present invention, by providing the filler layer 4 covering the base layer 2 on an end face of the roller in the axial direction to protect the end face and eliminating the exposure of the end face, it becomes possible to suppress generation of cut waste from the end face of the roller even when the end face of the roller is in contact with another member such as a ring-shaped member in a device. Even in cases in which the filler layer 4 is provided on the end face of the roller, when the filler layer 4 itself is scraped off due to contact with other members, a problem of cut waste occurs again, and therefore, in the present invention, it is assumed that the filler layer 4 is made of a material having the predetermined breaking strain and tensile stress and the strength of the filler layer 4 is secured, thereby forming the filler layer 4 which does not scrape even when the layer comes into contact with another member.

The material for forming the filler layer 4 has a breaking strain of 120% or more, and preferably 200 to 400%, and has a tensile stress at 100% elongation of 5 to 30 N/mm$^2$, and preferably 10 to 30 N/mm$^2$. By using a material satisfying such physical properties, it is possible to form the filler layer 4 having excellent durability, which does not scrape even when the layer comes into contact with another member. In cases in which the breaking strain is outside the above range, even when the tensile stress at 100% elongation satisfies the above range, the layer can not withstand a certain displacement or more and scraping occurs, and therefore, an expected effect of the present invention can not be obtained. In cases in which the tensile stress at 100% elongation is outside the above range, even when the breaking strain satisfies the above range, scraping occurs because the layer can not withstand a certain stress or more, and therefore, an expected effect of the present invention can not be obtained. Here, in the present invention, the breaking strain and the tensile stress at 100% elongation are values measured in accordance with a tensile test of JIS K 7127.

Specifically, in the present invention, it is preferable to form the filler layer 4 using a material containing a water-based urethane resin from the viewpoint of securing strength and making scraping less likely to occur. In particular, as described below, when the base layer 2 is formed of polyurethane foam, since the base layer 2 and the filler layer 4 using a water-based urethane resin have the same functional group, the compatibility thereof is good, and adhesiveness thereof become more favorable. This makes it possible to prevent occurrence of image defects caused by cut waste adhering to a photo sensitizer or the like inside the image forming device over a long period of time.

The water-based urethane resin is a self-emulsifying type obtained by emulsifying a urethane resin, and may be of any type, such as an ether-based, an ester-based, an ester/ether-based, and a carbonate-based, and from the viewpoint of adhesiveness to a roller end face and durability, an ester/ether-based or a carbonate-based is preferably used. The reason why a water-based urethane resin is used is that in a solvent system, a water-based urethane resin penetrates into the foam layer 2 and swells the foam layer 2.

The filler layer 4 preferably contains a silicone-based additive. By adding a silicone-based additive to a water-based urethane resin, it is possible to reduce the coefficient of friction of the surface of the filler layer 4 to be formed, making it difficult for the roller end part to be scraped, thereby further improving the durability. Specific examples of the silicone-based additive which can be used include acrylic-silicone graft polymer. The addition amount of the silicone-based additive is preferably from 5 to 30% by mass, and more preferably from 5 to 10% by mass in the material of the filler layer in solid content. In particular, by containing the silicone-based additive in an amount of 5 to 10% by mass, it is possible to provide the filler layer 4 in a uniform coating state while sufficiently reducing the frictional force.

The filler layer 4 can be formed by applying a coating liquid prepared by adding a silicone-based additive to a water-based urethane resin, as needed, to the end face using a dispenser, a stamp, a spray, a knife coater, or the like, then volatilizing, and curing. Specific examples of the coating method include a method of scratching and painting the paint supplied to the end face with a dispenser or the like with a doctor knife or the like and a method of spray painting on the end face, and as a heating method, a general method may be appropriately used.

Since the filler layer 4 may cover at least the end face of the base layer 2, the filler layer 4 may be formed to have the same diameter as the outer diameter of the roller or a diameter of the outer diameter of the base layer 2 or larger and smaller than the outer diameter of the roller. Specifically, for example, the roller may be formed with an outer diameter of [(outer diameter of the roller)–0 μm to (outer diameter of the roller)–250 μm], depending on the size of the roller.

The thickness of the filling layer 4 may be any thickness as long as it can completely cover an end face of the base layer 2, and is preferably from 10 to 100 μm. By setting the film thickness in this range, it is possible to accurately attach the roller to a mounting position when the roller is mounted on a cartridge, while securing the durability of the filler layer 4.

In the present invention, only that at least a base layer is covered with a filler layer on the end face in the roller axial direction is important, and other aspects can be appropriately configured according to a conventional method, and are not particularly limited.

For example, the shaft 1 is not particularly limited as long as it has a good conductivity, and any shaft can be used. Examples thereof include a steel material such as sulfur free cutting steel plated with nickel, zinc or the like, a solid metal core made of a metal such as iron, stainless steel, aluminum or the like, a metallic shaft such as a metal cylindrical body hollowed out in the interior, a highly conductive plastic shaft, and the like.

The base layer 2 is not particularly limited and can be formed of known rubber or resin, or a foam in which closed cells are dispersed therein. Specifically, the base layer 2 can be formed from elastomer such as polyurethane, silicone rubber, ethylene-propylene-diene rubber (EPDM), acrylonitrile-butadiene rubber (NBR), natural rubber, styrene-butadiene rubber (SBR), butadiene rubber, isoprene rubber, polynorbornene rubber, butyl rubber, chloroprene rubber, acrylic rubber, epichlorohydrin rubber (ECO), ethylene-vinyl acetate copolymer (EVA) and the mixture thereof, and is suitably composed of polyurethane foam. According to the present invention, generation of a cut waste can be suppressed, and therefore, a roller using polyurethane foam excellent in image characteristics can be used without problems. The foam constituting the base layer 2 is formed by foaming chemically the above-described elastomer with a foaming agent or by foaming it mechanically by involving air therein as in the case of polyurethane foam.

When the base layer 2 is formed of foam, bubbles in the foam are suitably closed-cell bubbles since compression permanent deformation performance is improved. In order for bubbles in the foam to be closed-cell, the procedure of foaming the above-described elastomeric raw material by mechanical stirring of the foam is suitably adopted.

Raw polyurethane materials for forming the polyurethane foam which are suitably used for the base layer 2 are not especially limited so long as they contain a urethane bond in the resin. As a polyisocyanate constituting the raw polyurethane material, aromatic isocyanate or the derivative thereof, aliphatic isocyanate or the derivative thereof, and alicyclic isocyanate or the derivative thereof are used. Aromatic isocyanate or the derivative thereof is preferable among them, and tolylenediisocyanate or the derivative thereof, and diphenylmethane diisocyanate or the derivative thereof are particularly suitably used. As tolylenediisocyanate or the derivative thereof, crude tolylenediisocyanate, 2,4-tolylenediisocyanate, 2,6-tolylenediisocyanate, the mixture of 2,4-tolylenediisocyanate and 2,6-tolylenediisocyanate, the urea modified products thereof, the biuret modified products thereof, the carbodiimide modified products thereof, and urethane product modified by polyol etc. are used. As diphenyl methane diisocyanate or the derivative thereof, for example, diphenylmethane diisocyanate or the derivative thereof, obtained by phosgenation of diaminodiphenylmethanes or the derivative thereof are used. The derivatives of diaminodiphenylmethane, include polynuclear products, and pure diphenylmethane diisocyanate obtained from diaminodiphenylmethane, polymeric diphenylmethane diisocyanates obtained from the polynuclear products of diaminodiphenylmethane can be used. As for the number of functional groups of polymeric diphenylmethane diisocyanate, a mixture of pure diphenylmethane diisocyanate and polymeric diphenyl methane diisocyanate having various numbers of functional groups is usually used, and a mixture having an averaged number of functional groups preferably from 2.05 to 4.00, more preferably from 2.50 to 3.50 are used. In addition, derivatives obtained by the modification of these diphenylmethane diisocyanates or derivatives thereof, for example, such as urethane modification products modified by polyol etc., dimers by uretdione formation, isocyanurate modification products, carbodiimide/uretonimine modification products, allophanate modification products, urea modification products, biuret modification products can be also used. Further, a blend of several kinds of diphenylmethane diisocyanates and the derivatives thereof can be also used.

Polyol components constituting raw polyurethane materials can be used which include polyether polyol from the addition polymerization of ethylene oxide with propylene oxide, polytetramethylene ether glycol, polyester polyol from the condensation of the acid component and the glycol component, polyester polyol from the ring-opening polymerization of caprolactone, and polycarbonate diol. Polyether polyol from the addition polymerization of ethylene oxide with propylene oxide include products from the addition polymerization of ethylene oxide with propylene oxide, for example, by using, as a starting material, water, propylene glycol, ethylene glycol, glycerin, trimethylolpropane, hexane triol, triethanolamine, diglycerine, pentaerythritol, ethylenediamine, methyl glucoside, aromatic diamine, sorbitol, sucrose, phosphoric acid, etc., and particularly suitable is a product from water, propylene glycol, ethylene glycol, glycerin, trimethylolpropane, hexane triol used as a starting material. As for the ratio and microstructure of added ethylene oxide and propylene oxide, the ratio of ethylene oxide is preferably from 2 to 95% by mass, more preferably from 5 to 90% by mass. In particular, the polyether polyol having ethylene oxide added on the terminal thereof is preferably used. The arrangement of ethylene oxide and propylene oxide in the molecular chain is preferably random. The molecular weight of this polyether polyol, bifunctional when obtained from water, propylene glycol and ethylene glycol as starting materials, is preferably in the range from 300 to 6000 by weight-average molecular weight, particularly preferably from 400 to 3000. The molecular weight of the polyether polyol, trifunctional when obtained from glycerin, trimethylolpropane and hexane triol as starting materials, is preferably in the range from 900 to 9000 by weight-average molecular weight, and particularly preferably from 1500 to 6000. A blend of the bifunctional polyol and the trifunctional polyol can be appropriately used.

Polytetramethylene ether glycol is obtained, for example, from cationic polymerization of tetrahydrofuran, and the product having weight-average molecular weight in the range from 400 to 4000, particularly from 650 to 3000 is preferably used. It is also preferable to blend polytetramethylene ether glycols with different molecular weights. In addition, polytetramethylene ether glycols obtained from copolymerization of alkylene oxides such as ethylene oxide and propylene oxide can be also used. It is also preferable to use a blend of polytetramethylene ether glycol and polyether polyol from addition polymerization of ethylene oxide with propylene oxide, and in this case, it is preferably used so that the ratio of polytetramethylene ether glycol to polyether polyol from addition polymerization of ethylene oxide with propylene oxide is within the range from 95:5 to 20:80 by mass, and particularly from 90:10 to 50:50. Polymer polyol of acrylonitrile-modified polyol, polyol of melamine added to polyol, diols such as butane diol, polyols such as trimethylolpropane and the derivatives thereof can be used in combination with the above-mentioned polyol components.

Polyol may be prepolymerized by polyisocyanate in advance, and the methods include a method in which polyol and polyisocyanate are put into a suitable vessel, sufficiently stirred and kept at 30 to 90° C., more preferably 40 to 70° C., for 6 to 240 hours, more preferably for 24 to 72 hours. In this case, the ratio of the quantities of polyol and polyisocyanate are preferably adjusted so that the isocyanate content ratio of the prepolymer to be obtained is from 4 to 30% by mass, more preferably from 6 to 15% by mass. If the isocyanate content ratio is less than 4% by mass, the stability of the prepolymer is damaged, and the prepolymer may be hardened during storage and not be able to be provided for use. When the isocyanate content ratio exceeds 30% by mass, polyisocyanate content that has not been prepolymerized increases, and since this polyisocyanate is hardened with polyol component to be used in a later polyurethane hardening reaction, via a reaction mechanism similar to a one-shot process that does not undergo prepolymerization reaction, the advantage of the prepolymer method is diminished. As polyol components, when isocyanate component is used which is in prepolymer of polyol prepolymerized in advance by polyisocyanate, diols such as ethylene glycol and butane diol, polyols such as trimethylolpropane and sorbitol, and the derivatives thereof can be used in addition to the above-mentioned polyol components.

To the raw polyurethane material can be added a conductive agent such as an ionic conducting agent and an electro-conductive agent, a filler material such as carbon black and inorganic carbonate, an antioxidant such as phenol and phenylamine, a friction-reducing agent, and a charge adjustment agent, etc. Examples of the ionic conducting agent include ammonium salts such as perchlorate, chlorate, hydrochloride, bromate, iodate, fluoroborate, sulfate, ethylsulfonate, carboxylate, sulfonate of tetraethylammonium, tetrabutylammonium, dodecyltrimethylammonium (for example, lauryl trimethyl ammonium), hexadecyl trimethyl ammonium, octadecyl trimethyl ammonium (for example, stearyl trimethyl ammonium), benzyl trimethyl ammonium, modified fat dimethylethyl ammonium, etc., and perchlorate, chlorate, hydrochloride, bromate, iodate, fluoroborate, trifluoromethylsulfonate, sulfonate of alkali and alkaline earth metals such as lithium, sodium, potassium, calcium, magnesium. Examples of the electro-conductive agent include conductive carbons such as Ketjen black, acetylene black; carbons for rubber such as SAF, ISAF, HAF, FEF, GPF, SRF, FT, MT; oxidation-treated carbon for ink, thermal decomposition carbon, natural graphite, artificial graphite; electro-conductive metal oxides such as tin oxide, titanium oxide, zinc oxide; metals such as nickel, copper, silver, germanium. These conductive agents may be used alone or in a mixture of more than or equal to two of them. The blending amount thereof is not particularly limited and can be appropriately selected as desired, and the ratio is usually from 0.1 to 40 parts by mass, preferably from 0.3 to 20 parts by mass with respect to 100 parts by mass of the raw polyurethane material.

Catalysts used in the hardening reaction of the raw polyurethane materials include monoamines such as triethylamine and dimethyl cyclohexylamine, diamines such as tetramethylethylene diamine, tetramethyl propane diamine and tetramethyl hexane diamine, triamines such as pentamethyldiethylene triamine, pentamethyldipropylene triamine, tetra-methylguanidine, cyclic amines such as triethylenediamine, dimethyl piperazine, methylethyl piperazine, methyl morpholine, dimethylaminoethyl morpholine, dimethyl imidazole, alcoholic amines such as dimethylamino ethanol, dimethylaminoethoxy ethanol, trimethylaminoethylethanol amine, methylhydroxyethyl piperazine, hydroxyethyl morpholine, ether amines such as bis(dimethylaminoethyl)ether, ethylene glycol bis(dimethyl)amino propyl ether, and organometallic compounds such as stannous octoate, dibutyl tin diacetate, dibutyl tin dilaurate, dibutyl tin mercaptide, dibutyl tin thiocarboxylate, dibutyl tin dimaleate, dioctyl tin mercaptide, dioctyl tin thiocarboxylate, phenyl mercury propionate, lead octenoate. These catalysts can be used alone or in combination of two or more of them.

In the present invention, it is preferable that a silicone foam stabilizer and various surfactants are combined into the raw polyurethane materials for stabilizing the cells in the foam material. As the silicone foam stabilizer, dimethylpolysiloxane-polyoxyalkylene copolymer, or the like is suitably used, and particularly preferable is the copolymer having the dimethylpolysiloxane moiety of molecular weight from 350 to 15000 and the polyoxyalkylene moiety of molecular weight from 200 to 4000. As for the molecular structure of the polyoxyalkylene moiety, the addition polymer of ethylene oxide and the co-addition polymer of ethylene oxide and propylene oxide are preferable, and the molecular terminals of the polymers are also preferably ethylene oxide. The surfactants include ionic surfactants such as cationic surfactants, anionic surfactants and amphoteric surfactants, and non-ionic surfactants such as various polyethers and various polyesters. The blending amount of the silicone foam stabilizer and the various surfactants are preferably from 0.1 to 10 parts by mass, more preferably from 0.5 to 5 parts by mass to 100 parts by mass of the raw polyurethane material.

The polyurethane foam used in the present invention preferably has a density within the range from 0.1 to 0.7 $g/cm^3$, more preferably from 0.50 to 0.65 $g/cm^3$. Too low and too high densities are both undesirable because the too low density leads to the coarsening of the bubble, and the too high density leads to the worsening of roller performance.

The ASKER C hardness of the polyurethane foam is preferably from 15 to 70°, more preferably from 15 to 45°. In the present invention, the mechanical floss method, the water foaming method, the foaming agent floss method, etc., which are conventionally used, can be used as a method of foaming in advance the raw polyurethane material, and the mechanical floss method, which performs foaming by mechanical stirring while mixing inactive gas, is preferably used regarding obtaining polyurethane foam of the closed-cell foam structure having a suitable density and hardness. Any inactive gasses used in the mechanical floss method are acceptable so long as they are inactive gas in polyurethane reaction, and include gasses non-reactive to the raw polyurethane materials such as nitrogen, carbon dioxide and dry air as well as inactive gasses in a narrow sense such as helium, argon, xenon, radon and krypton. By injecting the foamed raw polyurethane material into a metal mold, followed by the hardening thereof, polyurethane foam can be obtained which has self-skin layer (thin stratified film) formed on the part of the foam in contact to the metal mold. At that time, a method of coating with fluoro-resin etc. the inner surface of the metal mold can give mold-releasing property to the metal mold.

The molding conditions of the base layer 2 composed of polyurethane form is not particularly limited and can be obey usually conditions, and for example, the base layer 2 can be obtained by starting the foaming of the raw polyurethane material at a temperature within the range from 15 to 80° C., preferably from 20 to 65° C., and completing injection into the metal mold in which shaft 1 is placed, and then performing cure at a temperature from about 70 to 120° C., followed by removal of the product from the mold.

In the present invention, at least one film layer can be formed on the outer periphery of the base layer 2. Although in an example depicted in FIG. 1 one film layer 3 as a surface layer forming a roller surface is provided on the outer periphery of the base layer 2, two film layers of an intermediate layer and a surface layer can be also provided without limitation, and moreover, other functional layers may be added.

For example, the surface layer can be formed by solvent-based paints such as urethane-based, acrylic-based, acrylic urethane-based and fluorine-based ones, and the surface roughness of the layer can be adjusted by containing spherical microparticles made of urethane, acryl, silica, etc. The surface roughness of such a surface layer is usually less than or equal to 2 μm, particularly preferably within the range from 0.5 to 1.5 μm based on the JIS arithmetic average roughness Ra. Desired electrical conductivity can be given by appropriately containing the above-mentioned ionic conductive agent and the electron conductive agent as a conductive agent. Although the thickness of the surface layer is not particularly limited, it may be usually from 1 to 50 μm, particularly from about 1 to about 40 nm.

The intermediate layer may be a water-based paint containing a conductive agent, and any one or at least two types selected from the group consisting of rubber-based, urethane-based and acrylic-based paints can be suitably used as the water-based paint. Latex such as natural rubber (NR), chloroprene rubber (CR), nitrile rubber (NBR) and styrene-butadiene rubber (SBR) can be appropriately used as the rubber-based paint, ether-based, ester-based emulsions and dispersions as the urethane-based paint, and acryl, acrylic styrene emulsions etc. as the acrylic-based paint. The same conductive agents as those mentioned above with respect to the base layer 2 can be used as conductive agents contained in the paints without particular limitation. In addition, vulcanizers, vulcanization enhancers, rubber antioxidants, and the like can be appropriately added to the intermediate layer as desired.

The thickness of the intermediate layer is usually within the range from 10 to 100 μm, particularly from 30 to 80 μm. When the thickness is less than 10 μm, the solvent shielding effect for the base layer and the filler effect for preventing oozing of contaminant from the lower layer side become insufficient, resulting in solvent erosion that makes impossible to provide a desired surface roughness. On the other hand, when the thickness exceeds 100 μm, the intermediate layer cannot follow the softness of the base layer 2, causing a crack and a peeling, the hardening of the roller itself, which could lead to a defect relating to the roller performance such as toner damage.

The intermediate layer can be formed into one or at least two layers by applying the above-mentioned water-based paint onto base layer 2. Well-known procedures can be used as methods of coating the intermediate layer, which include, but are not limited to, dip coating, spray coating and roll-coater coating, and dip coating is suitably used. The micro hardness of the intermediate layer is suitably within the range from 10 to 45° for the film thickness of 500 μm, and the hardness roughly within this range can realize desired roller hardness for the finally obtained roller surface. The micro hardness can be measured, for example, by Micro Durometer Model MD-1.

The roller of the present invention is suitable as a conductive roller used in electrophotographic image forming devices etc. and can be suitably used specifically, for example, as various roller members such as developing rollers, electrification rollers, transfer rollers, toner supply rollers and cleaning rollers, and is particularly useful as a developing roller.

The roller of the present invention can be manufactured as follows: At first, a base layer is formed on the outer periphery of a shaft by molding; Then, as desired, at least one film layer, specifically for example, the above-mentioned surface layer is directly formed, or an intermediate layer and the surface layer are sequentially formed by coating on the formed base layer: Then, as desired, the formed base layer and the film layer are cut at the both ends of the roller in the axial direction thereof, wherein cases of cutting the base layer and the film layer at the both ends of the roller in the axial direction thereof include a case of cutting the end parts of the roller expanded by molding and a case of adjusting the size of the roller from the view point of the appearance of the roller; Then, by the above-mentioned techniques, the filler layer in a size enough to cover at least the base layer is provided on end faces of both ends of the base layer and the film layer in the roller axial direction or the cut surfaces of the cut base and film layers, and thus the roller of the present invention can be obtained.

Figure 2:
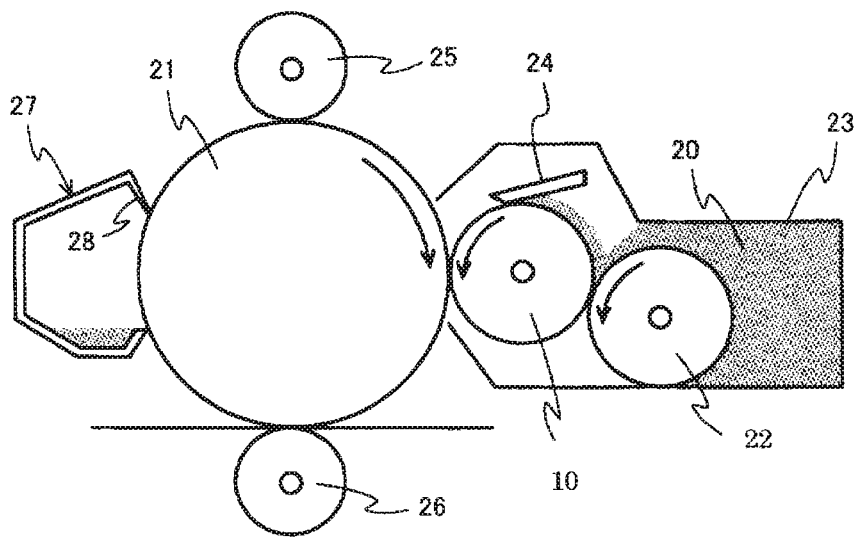
FIG. 2 is a partial cross-sectional view illustrating one configuration example of an image forming device of the present invention.

Further, the image forming device of the present invention is characterized in that the roller of the above present invention, especially the conductive roller, the developing roller among others is mounted thereon, thereby enabling to solve the problem of the occurrence of an image defect due to the attachment of cut waste onto photo sensitizer etc. FIG. 2 depicts a partial cross-sectional view of an example of the image forming device of the present invention. In the illustrated image forming device of the present invention, there are provided an image forming body 21, such as photo sensitizer, retaining an electrostatic latent image, a developing roller 10, in contact to the image forming body 21, for visualizing the electrostatic latent image by the adhesion of toner 20 supported on the surface of the roller thereto, and a toner supply roller 22 for supplying the toner 20 to the developing roller 10, and image formation is performed by a series of processes which convey the toner 20 from a toner container 23 via the toner supply roller 22 and the developing roller 10 to the image forming body 21.

In the illustrated image forming device, the image forming body 21 is electrified to a constant potential by an electrification roller 25, and then, an electrostatic latent image is formed on the image forming body 21 by an exposure device (not illustrated). Then, by the rotation of the toner supply roller 22, the developing roller 10 and the image forming body 21 in the direction of the arrow in the figure, the toner 20 on toner supply roller 22 is sent via the developing roller 10 to the image forming body 21. The toner 20 on the developing roller 10 is shaped into a uniform thin layer by a layering blade 24, and by the rotation of the developing roller 10 and the image forming body 21 in contact with each other, the toner 20 from developing roller 10 adheres to the electrostatic latent image in the image forming body 21, resulting in the visualization of the latent image. The toner 20 adhering to the latent image is transferred by the transfer roller 26 to recording medium such as paper, and the toner 20 remaining on the image forming body 21 after the transfer is removed by a cleaning blade 28 in a cleaning part 27. The image formation device of the present invention may be further provided with well-known compartments (not illustrated) used in conventional image forming devices.

EXAMPLES

The present invention will now be described in detail by using Examples.

First of all, polyurethane foam was supported on the outer periphery of a shaft (o 6 mm, 260 mm in length, material type: sulfur free cutting steel) by the mechanical floss method. The density of this polyurethane foam was 0.60 $g/cm^3$.

In particular, a raw polyurethane material composed of an isocyanate component (prepolymerized isocyanate TDI+ polyether polyol) of 100 parts by mass and a polyol component (polyether polyol) of 20 parts by mass, carbon-black (acetylene black) of 2 parts by mass, an ionic conducting agent (sodium perchlorate) of 0.2 parts by mass was prepared, and this raw polyurethane material was mechanically stirred, mixed with dry air by mixier, and foamed. The polyurethane-foam material was injected into a metal cylindrical split mold which was provided with a hole provided at the end thereof for penetrating the shaft and a metal cap placed for supporting the shaft. Inside the mold, the shaft was placed, with adhesive applied onto the outer periphery thereof. Then, the mold with polyurethane-foam material injected therein was left in a hot wind oven adjusted to be at 110° C. for one hour to allow the polyurethane-foam material to harden.

The hardened polyurethane foam was released from the mold and dip-coated with CR rubber latex paint combined with carbon black (Ketjen black) to form an intermediate layer of a film thickness of 60 μm on the outer periphery of the base layer. Then, the foam was dip-coated with polyurethane solvent-based paint combined with spherical polyurethane particles of $D^{50}$=10 μm and carbon black (acetylene black) to form a surface layer of a film thickness of 15 μm.

The roller body of the roller obtained above was cut at both ends of the roller in the axial direction thereof so that the size of the roller body was ø 11.5 mm and 240 mm in length. Then, on the cut surface of the roller body, each of the filler layers described in the following Table having a film thickness of 50 μm was formed to obtain the sample rollers of Examples. The filler layers were formed within the cut surface of ø11.5 mm by a seal coating (a transfer method by a seal-shaped jig) followed by heating.

<Evaluation Method>

Figure 3:
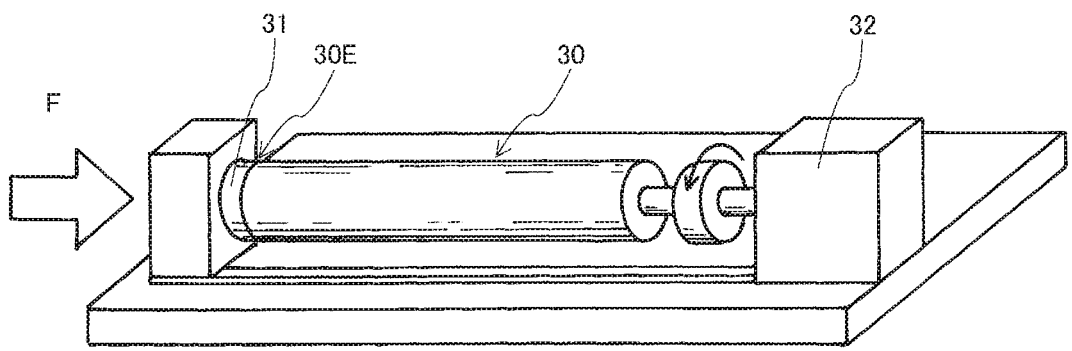
FIG. 3 is a schematic view illustrating a device used for durability evaluation in Examples.

Using the device illustrated in FIG. 3, the durability of cases in which a filler layer of each sample roller contacted and collided with another member in the device was evaluated. Specifically, with respect to an end part 30E of the roller body where a filler layer of each sample roller 30 was formed, a ring-shaped member 31 (inner diameter: 6 mm, outer diameter: 11.5 mm) made of polyacetal (POM) resin commonly used as a commercially available printer material was pressed with a load F of 1.5 N, and each sample roller was rotated at 200 rpm to evaluate the generation of scraping of the filler layer with elapsed time. Reference numeral 32 in the drawing indicates a motor. Evaluation criteria are as follows. The results are listed on the following table.

◯: The filler layer and the substrate were intact.

Δ: The filler layer is beginning to be removed.

x: Waste is generated due to scraping of the substrate.

damage on the filler layer and the roller body for 3 minutes or more even in the durability test, it was thereby confirmed that generation of cut waste can be suppressed.

Next, using a water-based urethane resin (ester/ether urethane, SUPERFLEX 150, manufactured by DKS Co., Ltd.) and silicone-based additive (US450, manufactured by Toagosei Co., Ltd.) in a blending amount (based on solid content) listed on the following table, a filler layer was formed with a film thickness of 50 μm in the same manner as above to prepare a sample roller of each Example.

With respect to each of the obtained sample rollers, the coating state of the filler layer was visually observed, and the static friction coefficient of the surface of the filler layer was measured three times, and the average value thereof was determined.

Using the apparatus illustrated in FIG. 3, the durability in cases in which the filler layer of each sample roller contacted

TABLE 1

| | | Physical properties of filler layer *[11] | | | | | |
|---|---|---|---|---|---|---|---|
| | | Breaking stress | Breaking strain | Tensile stress at 100% elongation | Durability | | |
| | Material | (N/mm$^2$) | (%) | (N/mm$^2$) | 1 min. | 2 min. | 3 min. |
| Comparative Example 1 | Water-based urethane resin *[1] | 13 | 1500 | 2.6 | x | x | x |
| Example 1 | Water-based urethane resin *[2] | 50 | 262 | 26 | ◯ | ◯ | ◯ |
| Example 2 | Water-based urethane resin *[3] | 44 | 221 | 26 | ◯ | ◯ | ◯ |
| Comparative Example 2 | Water-based urethane resin *[4] | 33 | 512 | 4.9 | ◯ | Δ | x |
| Example 3 | Water-based urethane resin *[5] | 20 | 122 | 18 | ◯ | ◯ | ◯ |
| Example 4 | Water-based urethane resin *[6] | 47 | 320 | 11 | ◯ | ◯ | ◯ |
| Example 5 | Water-based urethane resin *[7] | 48 | 340 | 9.8 | ◯ | ◯ | ◯ |
| Comparative Example 3 | Acrylic resin *[8] | 14 | 454 | 4.5 | ◯ | Δ | x |
| Example 6 | Water-based urethane resin *[9] | 17 | 430 | 9.8 | ◯ | ◯ | ◯ |
| Comparative Example 4 | Water-based urethane resin *[10] | 60 | 5 | Unmeasurable | ◯ | x | x |

*[1] Urethane emulsion, SUPERFLEX 300 (solid content 30% by mass), manufactured by DKS Co. Ltd.
*[2] Urethane emulsion, SUPERFLEX 150HS (solid content 38% by mass), manufactured by DKS Co. Ltd.
*[3] Ester/ether-based urethane, SUPERFLEX 150 (solid content 30% by mass), manufactured by DKS Co. Ltd.
*[4] Urethane emulsion, SUPERFLEX 470 (solid content 38% by mass), manufactured by DKS Co. Ltd.
*[5] Urethane emulsion (solid content 30% by mass)
*[6] Urethane emulsion (solid content 30% by mass)
*[7] Carbonate-based urethane (solid content 30% by mass)
*[8] Acrylic resin (solid content 30% by mass)
*[9] Urethane emulsion (solid content 30% by mass)
*[10] Urethane emulsion, SUPERFLEX 210 (solid content 35% by mass), manufactured by DKS Co. Ltd.
*[11] The breaking stress, breaking strain, and tensile stress at 100% elongation of a material of each filler layer, measured in accordance with a tensile test of JIS K 7127.

Figure 4:
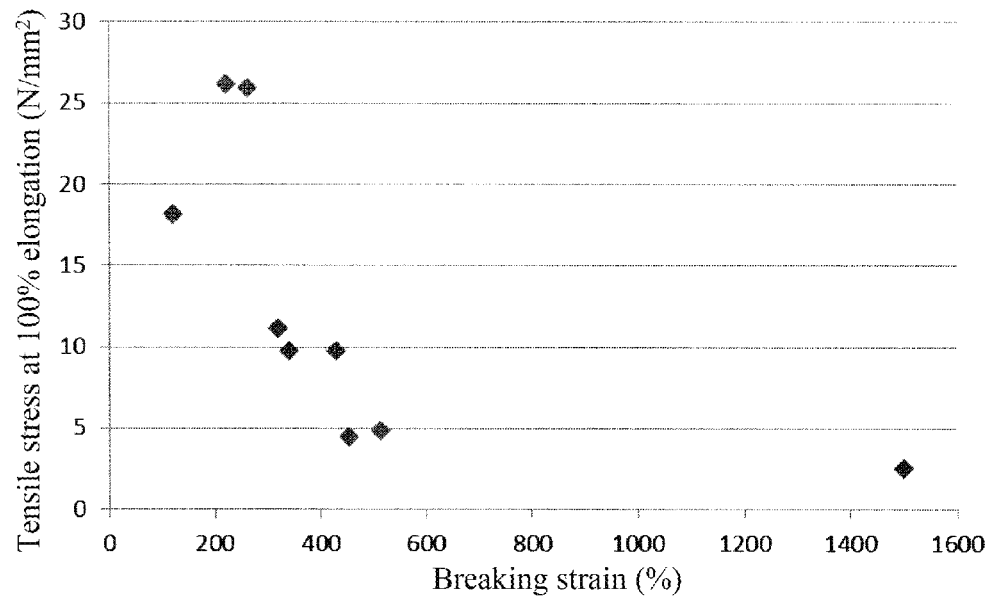
FIG. 4 is a graph illustrating a relationship between a breaking strain and a stress at 100% elongation in Examples.

The relationship between the breaking strain and the tensile stress at 100% elongation of the material of each filler layer according to each Example and Comparative Example is illustrated in a graph of FIG. 4.

Figure 5:
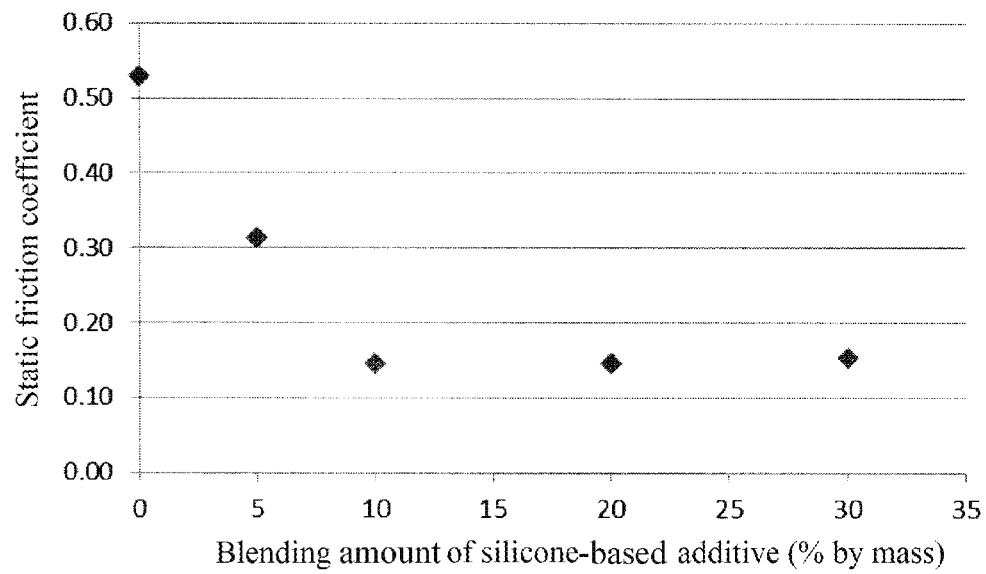
FIG. 5 is a graph illustrating a relationship between a blending amount of a silicone-based additive and a static friction coefficient in Examples.

As listed on the above table, a sample roller of each Example provided with a filler layer using a material satisfying conditions according to the present invention had no and collided with another member in a device was evaluated in the same manner as described above. The results are listed in combination on the table below. FIG. 5 is a graph illustrating the relationship between the blending amount of the silicone-based additive and the static friction coefficient of the material of each filler layer according to each Example and Comparative Example.

TABLE 2

|  | Material | % by mass | Material | % by mass | Coating state | Static friction coefficient | Breaking strain (%) | Tensile stress at 100% elongation (N/mm²) | Durability 1 min. | 2 min. | 3 min. | 4 min. |
|---|---|---|---|---|---|---|---|---|---|---|---|---|
| Example 2 | Water-based urethane resin *³ | 100 | — | 0 | Good | 0.53 | 221 | 26 | ○ | ○ | ○ | Δ |
| Example 7 | Water-based urethane resin *³ | 95 | Silicone-based additive *¹² | 5 | Good | 0.31 | 230 | 25 | ○ | ○ | ○ | Δ |
| Example 8 | Water-based urethane resin *³ | 90 | Silicone-based additive *¹² | 10 | Good | 0.15 | 240 | 24 | ○ | ○ | ○ | ○ |
| Example 9 | Water-based urethane resin *³ | 80 | Silicone-based additive *¹² | 20 | Sea-island shape | 0.15 | 210 | 27 | ○ | ○ | ○ | ○ |
| Example 10 | Water-based urethane resin *³ | 70 | Silicone-based additive *¹² | 30 | Sea-island shape | 0.15 | 200 | 28 | ○ | ○ | ○ | ○ |

*¹² Acrylic-silicone graft polymer, US450 (solid content 30% by mass), manufactured by Toagosei Co., Ltd.

As listed on the above table, it was confirmed that when a silicone-based additive was added to the water-based urethane resin in the filler layer, the friction coefficient was reduced, and the durability was improved accordingly. On the other hand, it was found that a urethane component and a silicone component were separated when the amount of the silicone-based additive was increased, and the coating state deteriorated.

DESCRIPTION OF SYMBOLS 1 shaft
2 base layer
3 film layer
4 filler layer
10 roller (developing roller)
20 toner
21 image forming body
22 toner supply roller
23 toner container
24 layering blade
25 electrification roller
26 transfer roller
27 cleaning part
28 cleaning blade
30 sample roller
30E end part of roller body
31 ring-shaped member
32 motor

The invention claimed is:

1. A roller comprising a shaft and a base layer provided on an outer periphery of the shaft, characterized in that
a filler layer covering the base layer is provided on end faces of both ends of the base layer in the roller axial direction, and the filler layer is composed of a material having a breaking strain measured according to a tensile test of JIS K 7127 of not less than 120% and a tensile stress at 100% elongation measured according to a tensile test of JIS K 7127 of from 5 to 30 N/mm².

2. The roller according to claim 1, wherein the material of the filler layer contains a water-based urethane resin.

3. The roller according to claim 1, wherein the material of the filler layer contains a silicone-based additive.

4. The roller according to claim 3, wherein the material of the filler layer contains the silicone-based additive in an amount of from 5 to 30% by mass.

5. The roller according to claim 1, wherein a film thickness of the filler layer is from 10 to 100 μm.

6. The roller according to claim 1 which is a conductive roller.

7. An image forming device is characterized in that the roller according to claim 1 is mounted thereon.

* * * * *